(12) United States Patent
Weichsel et al.

(10) Patent No.: US 11,901,707 B2
(45) Date of Patent: Feb. 13, 2024

(54) SYSTEM AND METHOD FOR MOUNTING AN ITEM OF SWITCHGEAR CABINET EQUIPMENT OF MODULAR CONSTRUCTION

(71) Applicant: RITTAL GMBH & CO. KG, Herborn (DE)

(72) Inventors: Thomas Weichsel, Erkelenz (DE); Thomas Michels, Troisdorf (DE); Lars Martin, Munzenberg (DE); Judith Zachrai, Herborn (DE)

(73) Assignee: RITTAL GMBH & CO. KG, Herborn (DE)

( * ) Notice: Subject to any disclaimer, the term of this patent is extended or adjusted under 35 U.S.C. 154(b) by 733 days.

(21) Appl. No.: 17/048,960

(22) PCT Filed: Apr. 17, 2019

(86) PCT No.: PCT/EP2019/059978
§ 371 (c)(1),
(2) Date: Oct. 19, 2020

(87) PCT Pub. No.: WO2019/202023
PCT Pub. Date: Oct. 24, 2019

(65) Prior Publication Data
US 2021/0151961 A1    May 20, 2021

(30) Foreign Application Priority Data
Apr. 20, 2018 (EP) .................... 18168441

(51) Int. Cl.
*H02B 1/30* (2006.01)
*G05B 19/418* (2006.01)
*H02B 3/00* (2006.01)

(52) U.S. Cl.
CPC ....... *H02B 1/308* (2013.01); *G05B 19/41805* (2013.01); *H02B 3/00* (2013.01);
(Continued)

(58) Field of Classification Search
None
See application file for complete search history.

(56) References Cited

U.S. PATENT DOCUMENTS 5,225,987 A   7/1993   Thompson
6,003,012 A   12/1999  Sascha

FOREIGN PATENT DOCUMENTS

DE    19512840 A1    10/1996
DE    102015007624 A1    12/2016
(Continued)

OTHER PUBLICATIONS

Delchambre A et al, "KBAP: an industrial prototype of knowledge-based assembly planner", Proceedings of the International Conference on Robotics and Automation Nice, May 12-14, 2019; [Proceedings of the International Conference on Robotics and Automation], Los Alamitos, IEEE Comp. Soc. Press, US, Band Conf. 8, 12. May 1992 (May 12, 1992), pp. 2404-2411.
(Continued)

*Primary Examiner* — Carlos R Ortiz Rodriguez
(74) *Attorney, Agent, or Firm* — Mark T. Vogelbacker; Eckert Seamans Cherin & Mellott, LLC

(57) ABSTRACT

A system and method for mounting a modular switch cabinet equipment in a switch cabinet housing (6) includes a computer-aided assistance unit (1) for determining a production-efficient assembly step sequence. The system and method further include at least one display unit (11-11') for image and/or text information, which is installed at the assembly site for at least one fitter (M) in order to visualize manual assembly steps (A; B; D) of the determined assembly step
(Continued)

Figure 1:
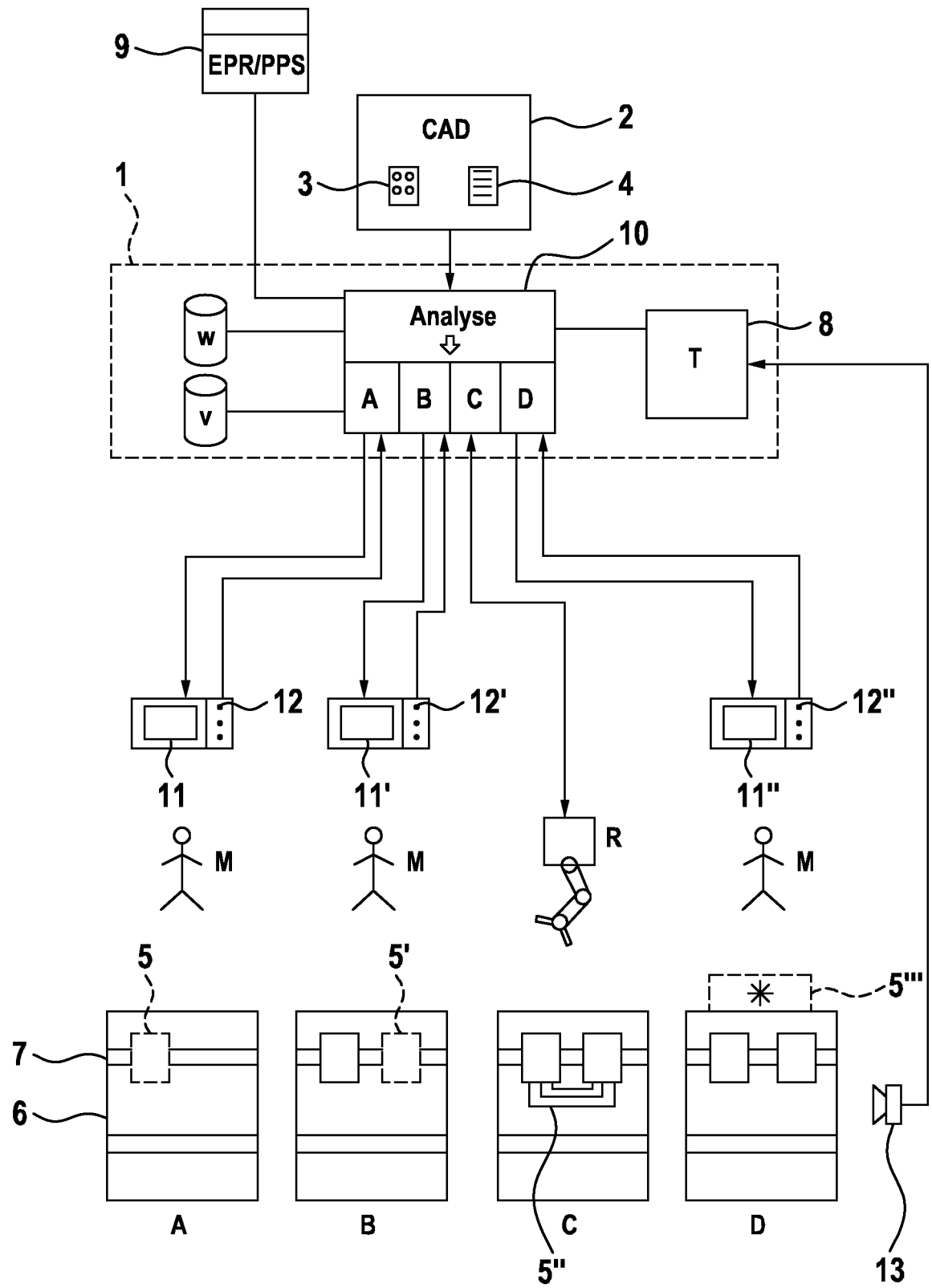

sequence. The system and method further includes at least one input unit (12-12') for acknowledgement of the completed assembly step (A; B; D) by the fitter (M).

9 Claims, 3 Drawing Sheets

(52) U.S. Cl.
CPC .............. *G05B 2219/31027* (2013.01); *G05B 2219/31044* (2013.01); *G05B 2219/31046* (2013.01)

(56) References Cited

FOREIGN PATENT DOCUMENTS

| | | | |
|---|---|---|---|
| EP | 3064325 | A1 | 9/2016 |
| GB | 2445690 | A | 7/2008 |
| JP | H04-041139 | A | 2/1992 |
| JP | H05-111835 | A | 5/1993 |
| JP | 06-052178 | A | 2/1994 |
| JP | 2002-207509 | A | 7/2002 |
| JP | 2006-318166 | A | 11/2006 |
| JP | 2010-211726 | A | 9/2010 |
| JP | 2015-060389 | A | 3/2015 |
| JP | 2015-125527 | A | 7/2015 |
| JP | 2016-213159 | A | 12/2016 |
| JP | 2019-074904 | A | 5/2019 |

OTHER PUBLICATIONS

Battini D et al, "Design configuration for a mixed-model assembly system in case of low product demand", The International Journal of Advanced Manufacturing Technology, Springer, Berlin, DE,Band 34, Nr. 1-2, Jun. 8, 2006 (Jun. 8, 2006), pp. 188-200.

Yao Y X et al, "A pragmatic system to support interactive assembly planning and training in an immersive virtual environment (I-VAPTS)", The International Journal of Advanced Manufacturing Technology, Springer, Berlin, DE,Band 30, Nr. 9-10, Dec. 9, 2005 (Dec. 9, 2005), pp. 959-967.

Kinney Lawrence E et al, "High-option manufacturing: The Denver works information-system architecture", Jul. 1, 1990 (Jul. 1, 1990), Band 69, Nr. 4, pp. 110-116.

Written Opinion and International Search Report of PCT/EP2019/059978, dated Jun. 21, 2019.

Elchambre A et al., "KBAP: an industrial prototype of knowledge-based assembly planner", Proceedings of the International Conference on Robotics and Automation Nice, May 12-14, 2019; [Proceedings of the International Conference on Robotics and Automation], Los Alamitos, IEEE Comp. Soc. Press, US, Band Conf. 8, May 12, 1992 (May 12, 1992), Seite 2404-2411.

Battini D et al., "Design configuration for a mixed-model assembly system in case of low product demand", The International Journal of Advanced Manufacturing Technology, Springer, Berlin, DE,Band 34, Nr. 1-2, Jun. 8, 2006 (Jun. 8, 2006), Seite 188-200.

Yao Y X et al., "A pragmatic system to support interactive assembly planning and training in an immersive virtual environment (I-VAPTS)", The International Journal of Advanced Manufacturing Technology, Springer, Berlin, DE, Band 30, Nr. 9-10, Dec. 9, 2005 (Dec. 9, 2005), Seite 959-967, XP019440735.

Kinney Lawrence E et al., "High-option manufacturing: The Denver works information-system architecture", Jul. 1, 1990 (Jul. 1, 1990), Band 69, Nr. 4, Seite 110-116, XP011628486.

Fig. 3a

| A | Installation module xy | Scheme | M |

Fig. 3b

| C | Installation module yz | Code | R |

SYSTEM AND METHOD FOR MOUNTING AN ITEM OF SWITCHGEAR CABINET EQUIPMENT OF MODULAR CONSTRUCTION

This application is a National Phase Application of International Application No. PCT/EP2019/059978, filed Apr. 17, 2019 and entitled "SYSTEM AND METHOD FOR MOUNTING AN ITEM OF SWITCHGEAR CABINET EQUIPMENT OF MODULAR CONSTRUCTION," which claims priority to European Patent Application No. 18168441.6, filed Apr. 20, 2018 and entitled "SYSTEM AND METHOD FOR ASSEMBLING A MODULAR CONTROL CABINET FEATURE," both of which are incorporated herein by reference in their entireties.

The present invention relates to a system as well as a method for the assembly of electrical and/or electronic built-in modules for the completion of a modular switch cabinet equipment in a switch cabinet housing, which is equipped with fastening means for several electrical and/or electronic built-in modules and further optional components. Furthermore, the invention also relates to a computer program product embodying the process as well as a special data format generated by it for the purpose of carrying out the assembly.

The field of the present invention relates to switch cabinet technology. Switch cabinets are used occasionally in the domestic field, but primarily in industrial applications for the protected housing of electrical and/or electronic components. Such a switch cabinet of the type of interest here accommodates the electrical and electronic components, which are usually designed in the form of standardized built-in modules, in order to preferably control an automated production plant, a process engineering plant, a machine tool or the like. Thus, the built-in modules in the control cabinet are control components that are not directly arranged in the machine as field devices. As built-in modules, for example, programmable logic establishing the connection to the power supply and the machines and systems to be controlled. The equipment of the switch cabinet with switch cabinet fittings is carried out according to an application-specific design.

Nowadays, such a design for the conceptual design and construction of enclosure equipment is software-based, for example created by EPLAN Pro Panel® form of a so-called planned design within the scope of the present application. Such a planned design includes in particular a three-dimensional mounting layout in the form of a layout, virtual wiring of the electrical and electronic installation modules and, if necessary, other components, as well as a configuration of copper bus bars and the like for flexible power distribution systems that is tailored to the electrical power to be fed in and distributed. The electrical or electronic installation modules can be fixed, for example, by means of top-hat rails in the interior of the switch cabinet. To complete the switch cabinet, optional components such as fans, filters, ventilators, heat exchangers, air conditioning units, interior lighting systems, cable entries and the like can also be designed. Furthermore, the data technical information scope of the planned design can also include additional information regarding structural boundary conditions, such as a special cable entry direction, necessary screw tightening torques of the fastening, necessary additional protective caps and the like.

In modern switchgear and control system construction, the planned design can be created by the customer, who creates the planning software-supported for his application. This construction step can also be carried out by the switchgear cabinet manufacturer according to customer specifications. As a planning aid, an assistant system with an attached object library is available, with which a switchgear cabinet configuration can be created under consideration of the geometrical dimensions and the valid standards. The resulting planned design is then transmitted to the switchgear and control cabinet manufacturer, who checks the planned design from an expert's point of view within the scope of a processing service and then instructs the switchgear cabinet to be completed in his electrical workshop. In the electrical workshop of the switchgear and control system builder, one or more fitters take over the assembly of the switchgear cabinet using their specialist knowledge and professional experience. Usually the switch cabinet leaves the electrical workshop in the form of a pre-assembled and pre-tested product which is installed, connected and commissioned at the customer's site.

Particularly during the assembly process, errors can occur in the implementation of the design, which is usually available to the fitters as an overall layout in conjunction with parts lists. For the implementation of the construction, sufficient knowledge and experience of the fitters is required to minimize the risk of errors and the assembly time.

It is an object of the present invention to further improve a process as well as a system for the assembly of a modular switchgear cabinet equipment in such a way that a technically supported error-free assembly of an application-individually configured switchgear cabinet equipment can be realized under consideration of a particularly time-efficient assembly step sequence.

The object is solved by a system for the assembly of a modular control cabinet equipment disclosed herein. A method carried out with this system, may be embodied in a computer program product The claims reflect advantageous further training of the invention.

The invention includes the systems engineering teaching that for the assembly of a modular switchgear cabinet equipment of the generic type a computer-aided assistance unit determines the production-efficient assembly step sequence by analyzing the planned design and breaking it down into individual assembly steps based on each other. The assistance unit determines whether individual assembly steps are best carried out by an assembler or a robot. The decision first involves the determination of various possible assembly alternatives, preferably based on the resources of assemblers and robot equipment, and the selection of the most efficient assembly alternative from these. As efficiency criterion primarily a calculatory assembly time for the total assembly process is used, which should be minimal. For the implementation of the production-efficient assembly step sequence determined by the computer-aided assistance unit, at least one display unit for image and/or text information is installed at the assembly site for at least one assembler, via which individual assembly steps of the determined assembly step sequence are visualized. This provides a supporting measure for a preferably error-free implementation of the construction. Furthermore, an input unit is installed at the installation site for the acknowledgement of a completed installation step by the fitter, so that the assistant unit can log the completion and call up the next planned installation step. The display unit can also be combined with an input unit, for example as a tablet computer with input-sensitive display.

A further assembly step as a result of the analysis by the computer-aided assistance unit may also be carried out by a robot device instead of an assembly operator if the analysis of the planned design by the assistance unit shows that at least one of the assembly steps is suitable for execution as an automated assembly step.

To carry out this analysis activity, which is essential to the invention, an analysis algorithm is implemented in the computer-aided assistance unit, which breaks down the planned construction, at least comprising a three-dimensional layout of the installation modules arranged in the switch cabinet with connection configuration as well as a parts list of the planned installation modules, into individual assembly steps which build on one another, in that the analysis algorithm, by accessing a knowledge database, assigns the installation modules to be assembled to an assembly step as well as to an associated assembly instruction in a defined sequence. If, for example, a power supply installation module is identified in the planned design and the knowledge database indicates that it must be installed first, the power supply installation module is assigned to installation step A. Furthermore, the knowledge database provides the installation instruction that the power supply installation module is to be installed manually by an installer. According to the layout, the power supply installation module must be mounted in the top left corner of the switch cabinet.

A data set containing this information can be used to uniquely describe each assembly step. The data record consists of an identifier for the assembly step, a designation of the assembly object, information in text or image form on how the assembly object is to be assembled (assembly instructions) and whether a robot device or an assembler is to perform this assembly step. This data record can also contain a prioritization indicating that preferably a robot device should carry out the assembly step and, alternatively, an assembler if the robot device is not available. Thus the data format contains specific information regarding the assignment 1. When? (Assembly steps A, B, C, D),
2. What? (mounting object x,y),
3. How? (assembly instruction scheme),
4. Who? (Robot/Mounter R/M).

This special data format has the advantage of universal usability both for an assembler, who can have an assembly instruction displayed in the form of text or image information, and with regard to the control of robot equipment, whereby the assembly instruction is stored in machine-readable for min this case. At the same time, this data format is limited to a concentrated data content, which can be processed quickly by computer and integrated into relational database models.

If the assembly instruction is issued to an assembler for the manual execution of an assembly step, it is proposed, in accordance with a measure further improving the invention, that the computer-aided assistance unit accesses a visualization database on which data records of an assembly step library are stored, in which image and/or text information for individual assembly steps of installation modules is stored in a retrievable manner. The assistant unit accesses individual data records of the visualization database in order to issue suitable assembly instructions to an installer depending on the analysis results.

In accordance with another measure improving the inventive step, it is proposed that the computer-aided assistance unit interacts with an evaluation device for testing sensor-registered actual installation positions of the mounted installation modules and all components with a target specification taking into account specified installation tolerances. It is particularly important, also when carrying out automated wiring of the control cabinet, that the actual installation position deviates within narrow installation tolerances from the target installation position specified by the planned design. If, for example, wiring is carried out as a subsequent assembly step, such a tolerance check ensures that the automated assembly step is carried out correctly. The result of such a tolerance check can generally be passed on between adjacent work steps in order to be able to take into account the result of the preceding assembly step in a tolerance-compensating manner.

According to another invention-improving measure, it is proposed that the computer-aided assistance unit is connected to a manufacturing control system of the manufacturing plant in order to take into account information about operationally available manufacturing resources of fitters and/or robot equipment. On this basis, the computer-aided assistance system is able to determine an assembly step sequence that is adapted to the current production workload. If information obtained from the production control system shows, for example, that wiring robot equipment has failed due to malfunctions or is already fully loaded with other assembly tasks for the planning period, the computer-aided assistance system can determine that instead a manual execution of the assembly step of a wiring is carried out by an assembler. Against this background, the computer-aided assistance system can, taking the production planning into account, convert an assembly step originally planned as an automated assembly step into a manual assembly step and, with regard to this, issue the assembly instruction not in the form of control commands for a robot device but in the form of image and/or text information to support the assembler.

The method according to the invention for the assembly of a generic modular switch cabinet equipment is preferably designed as a computer program product whose program codes serve to carry out the method. The analysis of the planned construction serving as input information can take place at a central location, whereas the visualization of individual assembly steps for the assembler or the control of robot equipment for the automated execution of assembly steps is carried out decentral at the assembly site. Because of the intended acknowledgement of completed assembly steps by the assembler or by the robot device, the communication between the assembly site and the central assistance unit runs bidirectionally, whereby the individual process steps are carried out within this distributed system.

Figure 2:
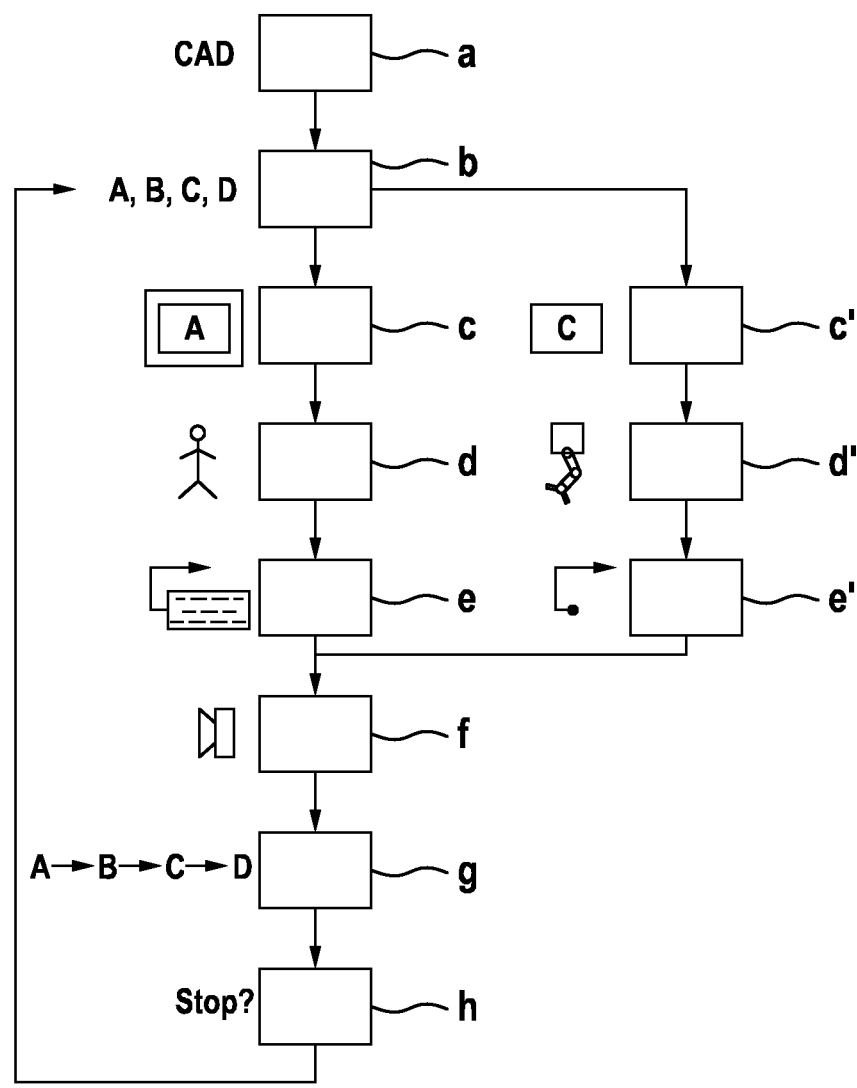

Further measures to improve the invention are described in more detail below together with a description of an example of how to implement the invention using the figures. It shows:

FIG. 1: a schematic block diagram of a system for the assembly of a modular control cabinet equipment, FIG. 2: a flow chart of individual steps of the assembly procedure to be carried out with the system, FIG. 3a: an exemplary data set output by the computer-aided assistance unit to initiate an assembly step A, and FIG. 3b: An example data set that is output by the computerized assistance unit to initiate an assembly step D.

According to FIG. 1, a system for the assembly of a modular control cabinet equipment includes a computer-aided assistance unit 1 for the determination of a production-efficient assembly step sequence. This is done on the basis of a planned design 2, which is fed to the assistant unit 1 in file form. The planned design 2 contains information regarding a three-dimensional layout 3 and a parts list 4 of all installation modules 5 to 5''' and other components, which are to be mounted in a switch cabinet housing 6 on fasteners 7, e.g. top-hat rails.

To determine the production-efficient assembly step sequence, the computer-aided assistance unit 1 breaks down the planned construction 2 into individual assembly steps which build on each other and which are to be carried out either by a fitter M or by a robot device R. For this purpose, an analysis algorithm is implemented in the computer-aided assistance unit 1 within the scope of an analysis 10, which assigns the installation modules 5 to 5''' to be mounted according to the planned construction 2 in a defined sequence to an assembly step A-D as well as to a respective assembly instruction. The analysis is carried out with access to a connected knowledge database W, in which information about the necessary process knowledge—for example assembly contents, assembly sequence, assembly expertise—is stored.

Furthermore, the computer-aided assistance unit 1 includes a visualization database V, in which data records of an assembly step library are stored. These data sets contain image and/or text information for the individual assembly steps A-D, which are made available to the fitter M at the assembly site to assist him in carrying out the assembly step instructed there.

Furthermore, the computer-aided assistance unit 1 is equipped with an evaluation device 8, which interacts an examination of actual installation positions of the mounted installation modules 5 to 5''', which are recorded by sensors via a camera unit 13, with a target specification taking into account specified installation tolerances.

In addition, the computer-aided assistance unit 1 also receives information about operationally available production resources from a higher-level production control system 9 in the form of an ERP/PPS to assemblers M and/or robot equipment R in order to determine an efficient assembly step sequence. Against the background of this information, the computer-aided assistance unit 1 determines an assembly step sequence A to D that is adapted to the current production capacity utilization of the plant.

If the computer-aided assistance unit 1 determines that assembly steps A, B and D are to be carried out manually by a fitter M, a corresponding work instruction in the form of a picture and/or text information is displayed on a display unit 11 installed at the assembly site. Subsequent display units 11' and 11" are provided to visualize other manual assembly steps C and D of the assembly step sequence determined by the computer-aided assistant unit 1. Furthermore, an input unit 12 to 12" is also installed at the installation site for manual installation by a fitter, whereby the fitter must at least acknowledge a completed installation step so that the computer-aided assistant unit 1 can, for example, log the completion of installation step A as a result of this information in order to then call up the next planned installation step B. This can be carried out at the same assembly site or at an adjacent assembly site in the workshop.

The basic sequence of an assembly procedure performed by the system is explained below using FIG. 2:

As part of an initial step a), a planned design created using software such as EPLAN Pro Panel® is made available to the computer-aided assistance unit for analysis. The planned design includes at least data on the three-dimensional layout and the associated bill of materials information on the enclosure equipment of the enclosure to be mounted. The file of the planned design thus describes the application-specific configuration of the control cabinet.

In a step b) the data of the planned construction is processed by using an analysis algorithm in order to split the planned construction into individual assembly steps A, B, C, D which are built up one into the other. The analysis algorithm determines in the context of the decomposition by recourse to a knowledge data base whether an assembler or a robot device should carry out the respective assembly step and makes a corresponding allocation.

If the analysis shows that an assembly step A resulting from the disassembly of the planned construction has to be carried out manually, step c) is followed by a visualization of the manual assembly step A of the determined assembly step sequence for the assembler on a display unit installed at his workplace. The display unit contains image and/or text information as assembly instructions which have been taken from a visualization database by the computer-aided assistance unit.

Then, in step d), the fitter carries out the displayed manual fitting step A, in which, for example, a device adapter for a programmable logic controller is attached to a top-hat rail of the control cabinet as a built-in module.

If the assembly step A is completed by the assembler, the assembler acknowledges in one step e) the professionally executed assembly via an input unit installed at the assembly site, which in this execution example is designed as a keyboard in order to be able to enter not only the binary acknowledgment information but also comments on special situations in the course of the executed assembly, which are fed back to the computer-aided assistance unit. This information is fed back to the computer-aided assistance unit. Such a mounting difficulty can be caused by the fact that an electrical installation module to be placed in the top left corner of the housing is difficult to attach to the top-hat rail of the mounting plate attached to the rear wall of the switch cabinet due to possible large geometric dimensions. With this and similar information, the knowledge database of the computer-aided assistance unit can then be enriched in terms of information technology so that the planning of future assembly steps can be improved. If the aforementioned feedback information on the mounting difficulty is assessed as relevant, it can be ruled out in future that identical or similar installation modules of this critical installation position in the switch cabinet will be provided. In this respect, this feedback also has an effect on future CAD designs with the software-supported planning tool mentioned at the beginning.

Once the installation has been completed, acknowledged and commented on if necessary, the installation tolerances of the mounted installation module are checked sensor technically in the following step f). This can be done, for example, by means of a camera unit of an image acquisition system, which records the actual installation position of the mounted built-in module.

In the following step d), the tolerance information is taken into account by the computer-aided assistant unit during the next assembly step after the target/actual comparison, and passed on if necessary. In this way, a subsequent assembly step, especially an automated assembly step, can receive the information as to whether this step can be performed at all by a robot device due to the actual installation position or whether it must be reworked first.

This assessment of the admissibility of deviations within a specified tolerance field is carried out in step h) of the assembly step sequence. The next assembly step B is then called up.

If one of the assembly steps A, B, C, D is defined as automated assembly step C in step b), this automated assembly step C is output by the assistant unit in step c') to a robot device in the form of machine-readable assembly instructions for equipping the switch cabinet equipment.

Such a robot device can be, for example, a wiring robot for the electrical and electronic installation modules. With the assembly of these built-in modules the position of the electrical connection pins is known due to the planned construction, in particular the known layout. These pins can be automatically wired inside the cabinet according to a wiring diagram which also belongs to the planned construction.

This is done in the following step d'), in which the robot device carries out the automated assembly step C according to the robot control. The control commands of the robot control unit are obtained from the machine-readable assembly instructions of the assistance unit.

After completion of the automated assembly step C, it is also acknowledged in step e') so that the computer-aided assistance unit can log the completion of the automated assembly step C and call up the next scheduled assembly step D.

Before this, however, the installation tolerance test is carried out in accordance with steps f) to h).

In FIG. 3a an exemplary output data set of the computer program product is illustrated, which, as a result of the analysis performed by the computer-aided assistance unit, breaks down the planned design into individual assembly steps A, B, C, D. In order to describe the assembly step sequence, the data format of the output data set comprises at least one key identifier for the exemplary assembly step "A", to which a designation of the assembly object is assigned "Installation module xy" and—in the case of an assembly step to be executed manually—the assembly instruction to be used for this purpose in the form of image and/or text information "Scheme" as well as an identifier for the fact that this assembly step is assigned to a manual assembly "M" at a specific assembly location.

According to FIG. 3b, the output data set for an assembly step to be performed automatically by a robot device consists of the key identification of assembly step "C", the designation of the assembly object "installation module yz", the associated assembly instruction in the form of a machine-readable information "code" and an identification for the assignment to the automated assembly R by a specific robot device.

The invention is not limited to the preferred design example described above. For example, other sequences of manual and automated assembly steps can also be carried out. Even a purely manual sequence of assembly steps or a purely automated sequence of assembly steps can be implemented according to the principle of the solution according to the invention.

The invention claimed is:

1. A method for mounting a modular switch cabinet equipment in a switch cabinet housing (6), which is equipped with at least one fastening means for a plurality of electrical or electronic installation modules (5-5'''), the method comprising the following steps:
   a) provision of a planned design (2) for an application-specific configuration of the switch cabinet equipment to a computer-aided assistance unit (1),
   b) preparation for assembly by analysis of the planned design(2) and disassembly into individual assembly steps (A, B, C, D) which build on one another and are to be carried out by a fitter (M) or a robot device (R) by the computer-aided assistance unit (1) for determining an efficient assembly step sequence, wherein in case (1) where the fitter (M) is designated to carry out an assembly step (A; B; D) of the determined assembly step sequence, the following steps are carried out by the fitter (M):
   c) visualization of a manual assembly step (A) of the determined assembly step sequence by a display unit (11-11'') installed at an assembly site for the fitter (M) for image and/or text information as assembly instructions,
   d) performance of the manual assembly step (A) by the fitter (M) in accordance with the image and/or text information,
   e) acknowledgement of completion of the manual assembly step (A) via an input unit (12-12'') installed for the fitter (M) at the assembly site for logging the completion and for calling up a next planned assembly step (B) by the computer-aided assistance unit 1), wherein, in addition to the steps c) to e) to be carried out manually by the fitter (M) according to the case (I), at least one automated assembly step (C) to be carried out with the aid of a robot is defined in a case (II) as a result of an analysis by the computer-aided assistance unit (1),
   wherein the automated assembly step (C) c') is issued by the computer-aided assistance unit (1) in the form of machine-readable assembly instructions for the assembly of the switch cabinet equipment to the robot device (R);
   wherein d') the robot device (R) carries out the automated assembly step (C) in accordance with robot control, and
   e') after completion of the automated assembly step (C), the computer-aided assistant unit (1) acknowledges the automated assembly step (C) to log the completion and to call up a final assembly step (D).

2. The method according to claim 1, wherein the computer-aided assistance unit (1) determines an efficient assembly step sequence on the basis of an alignment of available production resources of fitter (M) or the robot device (R) for carrying out the assembly steps (A, B, C, D) in order to convert the automated assembly step (C) into a manual assembly step (C) if the robot device (R) is not available.

3. The method according to claim 1, wherein the computer-aided assistance unit (1) makes a selection between different variants of assembly step sequences on the basis of a shortest possible assembly time or required assembly resources assembly of the switch cabinet equipment.

4. The method according to claim 1, wherein after the acknowledgement e) or e') step: f) installation tolerances of the thew plurality of electrical or electronic installation modules (5-5''') are checked by sensors, the installation tolerances g) are passed on as tolerance information by the computer-aided assistant unit (1) to a next assembly step, so that h) an evaluation of permissibility of deviations within a specified tolerance field is carried out before a subsequent assembly step is released.

5. A system for mounting a modular switch cabinet equipment in a switch cabinet housing (6), which is equipped with at least one fastening means for a plurality of electrical or electronic installation modules (5-5'''), the system comprising:
   a computer-aided assistance unit (1);
   a display unit (11-11'');
   an input unit (12-12''); and
   an analysis algorithm;
   wherein the computer-aided assistance unit, the display unit, and the input unit are implemented to perform the following steps:

a) provision of a planned design (2) for an application-specific configuration of the switch cabinet equipment to the computer-aided assistance unit (1),
b) preparation for assembly by analysis of the planned design(2) and disassembly into individual assembly steps (A, B, C, D) which build on one another and are to be carried out by a fitter (M) or a robot device (R) by the computer-aided assistance unit (1) for determining an efficient assembly step sequence, wherein in case (I) where the fitter (M) is designated to carry out an assembly step (A; B; D) of the determined assembly step sequence, the following steps are carried out by the fitter (M):
c) visualization of a manual assembly step (A) of the determined assembly step sequence by the display unit (11-11") installed at an assembly site for the fitter (M) for image and/or text information as assembly instructions,
d) performance of the manual assembly step (A) by the fitter (M) in accordance with the image and/or text information,
e) acknowledgement of completion of the manual assembly step (A) via the input unit (12-12") installed for the fitter (M) at the assembly site for logging the completion and for calling up a next planned assembly step (B) by the computer-aided assistance unit 1), wherein, in addition to the steps c) to e) to be carried out manually by the fitter (M) according to the case (I), at least one automated assembly step (C) to be carried out with the aid of a robot is defined in a case (II) as a result of an analysis by the computer-aided assistance unit (1),
wherein the automated assembly step (C) c') is issued by the computer-aided assistance unit (1) in the form of machine-readable assembly instructions for the assembly of the switch cabinet equipment to the robot device (R);
wherein d') the robot device (R) carries out the automated assembly step (C) in accordance with robot control, and e') after completion of the automated assembly step (C), the computer-aided assistant unit (1) acknowledges the automated assembly step (C) to log the completion and to call up a final assembly step (D).

6. The system according to claim 5, wherein the analysis algorithm (10) is implemented in the computer-aided assistance unit (1), which analyses the planned design (2), at least comprising a digitized three-dimensional layout (3) and a parts list information (4) of the plurality of electrical or electronic installation modules (5-5'''), into the individual assembly steps (A, B, C, D) which build on one another, in that the analysis algorithm (10), by accessing at least one knowledge database (W), assembles the plurality of electrical or electronic installation modules (5-5') to be assembled in a defined according to the individual assembly steps (A; B; C; D) and an associated assembly instruction in a defined order.

7. The system according to claim 5, wherein the computer-aided assistance unit (1) accesses a visualization database (V), on which data objects of an assembly step library are stored, in which image or text information for the individual assembly steps (A, B, C, D) is stored.

8. The system according to claim 5, wherein the computer-aided assistance unit (1) for step sequence control interacts with a tolerance evaluation device (T) for checking actual installation positions of the plurality of electrical or electronic installation modules (5-5''') detected by sensors with a nominal specification taking into account specified installation tolerances.

9. The system according to claim 5, wherein the computer-aided assistance unit (1) processes information from a production control system (9) about operationally available production resources of fitter (M) or robot devices (R) to determine the individual assembly steps (A, B, C, D) matched to the current production capacity utilization.

* * * * *